(12) United States Patent  
Chen et al.

(10) Patent No.: US 7,595,954 B1  
(45) Date of Patent: Sep. 29, 2009

(54) DISK DRIVE TO ESTIMATE REPEATABLE RUNOUT (RRO) BASED UPON ON AN OPTIMAL MEAN SQUARE ESTIMATION (MSE) LEARNING METHOD

(75) Inventors: Min Chen, San Jose, CA (US); Li Yi, Berkeley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 216 days.

(21) Appl. No.: 11/406,089

(22) Filed: Apr. 18, 2006

(51) Int. Cl.
  *G11B 5/596* (2006.01)
(52) U.S. Cl. .............................. 360/77.08; 360/77.04
(58) Field of Classification Search ....................... None
  See application file for complete search history.

(56) References Cited

U.S. PATENT DOCUMENTS

2003/0184909 A1* 10/2003 Zhang et al. ............. 360/77.04
2004/0246619 A1   12/2004 Zhang
2007/0008645 A1*  1/2007 Takaishi ................. 360/77.04

* cited by examiner

*Primary Examiner*—Andrew L Sniezek  
(74) *Attorney, Agent, or Firm*—Blakely, Sokoloff, Taylor & Zafman (57) ABSTRACT

Disclosed is a method of estimating repeatable runout (RRO) for a disk drive. The method includes: determining a plurality of position error signal (PES) values for a plurality of servo wedges of a track of a disk; and estimating repeatable runout (RRO) in the PES values for the servo wedges of the track by averaging determined PES values over a pre-determined number of revolutions of the disk of the disk drive and scaling the averaged PES values by a pre-determined ratio of the variance of non-repeatable runout (NRRO) to the variance of an optimal estimation of the RRO for the disk drive.

14 Claims, 5 Drawing Sheets

DISK DRIVE TO ESTIMATE REPEATABLE RUNOUT (RRO) BASED UPON ON AN OPTIMAL MEAN SQUARE ESTIMATION (MSE) LEARNING METHOD

BACKGROUND OF THE INVENTION

1. Field of the Invention

The present invention relates to disk drives. More particularly, the present invention relates to a disk drive to estimate repeatable runout (RRO) based upon an optimal mean square estimation (MSE) learning method.

2. Description of the Prior Art and Related Information

In order to keep up with consumer demand for disk drives with greater memory and smaller form factor sizes, disk drives are being manufactured with ever-increasing storage capacity in terms of the number of bits that can be recorded on a given track of a disk as well as the number of tracks that can be written on a disk (often referred to as track density).

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes a disk having a plurality of concentric tracks. Each surface of each disk conventionally contains a plurality of concentric data tracks angularly divided into a plurality of data sectors. In addition, special servo information may be provided on each disk to determine the position of the moveable transducer head.

The most popular form of servo is called "embedded servo" wherein the servo information is written in a plurality of servo wedges that are angularly spaced from one another and are interspersed between data sectors around each track of each disk.

Each servo wedge may includes a phase lock loop (PLL) field, a servo synch mark (SSM) field, a track identification (TKID), a wedge ID field having a binary encoded wedge ID number to identify the wedge, and a group of servo bursts (e.g. an alternating pattern of magnetic transitions) which the servo control system of the disk drive samples to align the moveable transducer head with or relative to a particular track. Typically, the servo control system moves the transducer head toward a desired track during a course "seek" mode using the TKID field as a control input.

Once the moveable transducer head is generally over the desired track, the servo control system uses the servo bursts to keep the moveable transducer head over that track in a fine "track follow" mode. The transducer head generally reads the servo bursts to produce a position error signal (PES) that is 0 when the transducer head is at a particular radial position.

The general goal of the servo control system is to control the transducer head position relative to a desired position— i.e. to get it there and to keep it there. There are numerous outside influences, which make it difficult for the servo control system to achieve the desired transducer head position, but a particularly troublesome influence is known as "runout."

Runout generally refers to deviation from perfect circular motion and, more particularly, refers to variation in the distance between an external point of reference and a passing surface of a rotating object. "Repeatable runout" involves periodic deviations that occur with predictable regularity (hereinafter "RRO"). "Nonrepeatable runout" involves random perturbations due to, for example, resonance modes, disk flutter, windage, disk vibrations, and so on (hereinafter NRRO).

In the context of a disk drive, RRO is "repeatable" because it occurs in synchronization with the spinning disk. RRO comes from one or more of the following sources: a) spindle motor runout; b) disk slippage; c) disk warping; and d) disturbances converted to RRO during the servo-writing process due to, for example, vibrations, resonances, media defects, or disk distortion due to clamping of the HDA. RRO that is written-in to the disk during the servo-writing process may be referred to as written-in RRO (WRRO). WRRO and other repeatable disturbances may be collectively referred to as RRO. RRO appears as a component of the PES.

Determining and canceling RRO has become more important as higher track densities in disk drives are achieved. Particularly, determining the RRO of a disk for use in track following is important because excessive RRO may cause track mis-registration (TMR) problems. In fact, RRO may ultimately lead to an upper limit on achievable track densities, as RRO cuts into the available track misalignment budget. Methods of determining RRO and then canceling it by one of a variety of techniques are already well known in the art.

For example, a common method of determining RRO is a time averaging method. In this method, during disk drive manufacture, PES values are averaged for servo wedges of a track over many revolutions during a dedicated RRO learning process. Determined RRO values may then be written in the servo wedges. In subsequent disk drive operation, during servo track following, the RRO may be compensated for by subtracting the stored RRO value such that a smaller PES value is achieved and fewer TMR problems occur. A conventional averaging algorithm that is commonly utilized is:

$$\frac{1}{n}\sum_{i=1}^{n} PES(n);$$

wherein n is the number of revolutions of the disk of the disk drive and PES (n) is the collected PES on all wedges of a track at an n-th revolution.

The dedicated RRO learning process is presently performed for each disk drive during disk drive manufacture and it is a time consuming process that introduces a great deal of cost to the manufacture of the disk drive. Therefore, techniques to improve the speed and accuracy of the RRO learning process are constantly sought after.

SUMMARY OF THE INVENTION

The present invention relates to disk drives. More particularly, the present invention relates to a disk drive to estimate repeatable runout (RRO) based upon an optimal mean square estimation (MSE) learning method.

In one embodiment of the present invention, a method of estimating repeatable runout (RRO) for a disk drive is disclosed that includes: determining a plurality of position error signal (PES) values for a plurality of servo wedges of a track of a disk; and estimating repeatable runout (RRO) in the PES values for the servo wedges of the track by averaging determined PES values over a pre-determined number of revolutions of the disk of the disk drive and scaling the averaged PES values by a pre-determined ratio of the variance of non-repeatable runout (NRRO) to the variance of an optimal estimation of the RRO for the disk drive.

In another embodiment of the present invention, a disk drive to estimate repeatable runout (RRO) is disclosed. The disk drive includes a disk including at least one track having a plurality of servo wedges, a moveable head, and a servo controlller for controlling the position of the moveable head to perform track following on the plurality of servo wedges of the track and to measure a plurality of position error signal (PES) values. The servo controller is utilized to: determine a plurality of position error signal (PES) values for a plurality of servo wedges of the track of the disk and estimate repeatable runout (RRO) in the PES values for the servo wedges of the track by averaging determined PES values over a pre-determined number of revolutions of the disk of the disk drive and to scale the averaged PES values by a pre-determined ratio of the variance of non-repeatable runout (NRRO) to the variance of an optimal estimation of the RRO for the disk drive.

In yet another embodiment, a processor-readable medium is disclosed, wherein the processor-readable medium has stored thereon instructions, which, when executed by a processor, cause the processor to perform operations to estimate repeatable runout (RRO) for a disk drive. These operations include: determining a plurality of position error signal (PES) values for a plurality of servo wedges of a track of a disk; and estimating repeatable runout (RRO) in the PES values for the servo wedges of the track by averaging determined PES values over a pre-determined number of revolutions of the disk of the disk drive and scaling the averaged PES values by a pre-determined ratio of the variance of non-repeatable runout (NRRO) to the variance of an optimal estimation of the RRO for the disk drive.

The foregoing and other features of the invention are described in detail below and are set forth in the appended claims.

DETAILED DESCRIPTION

Figure 1:
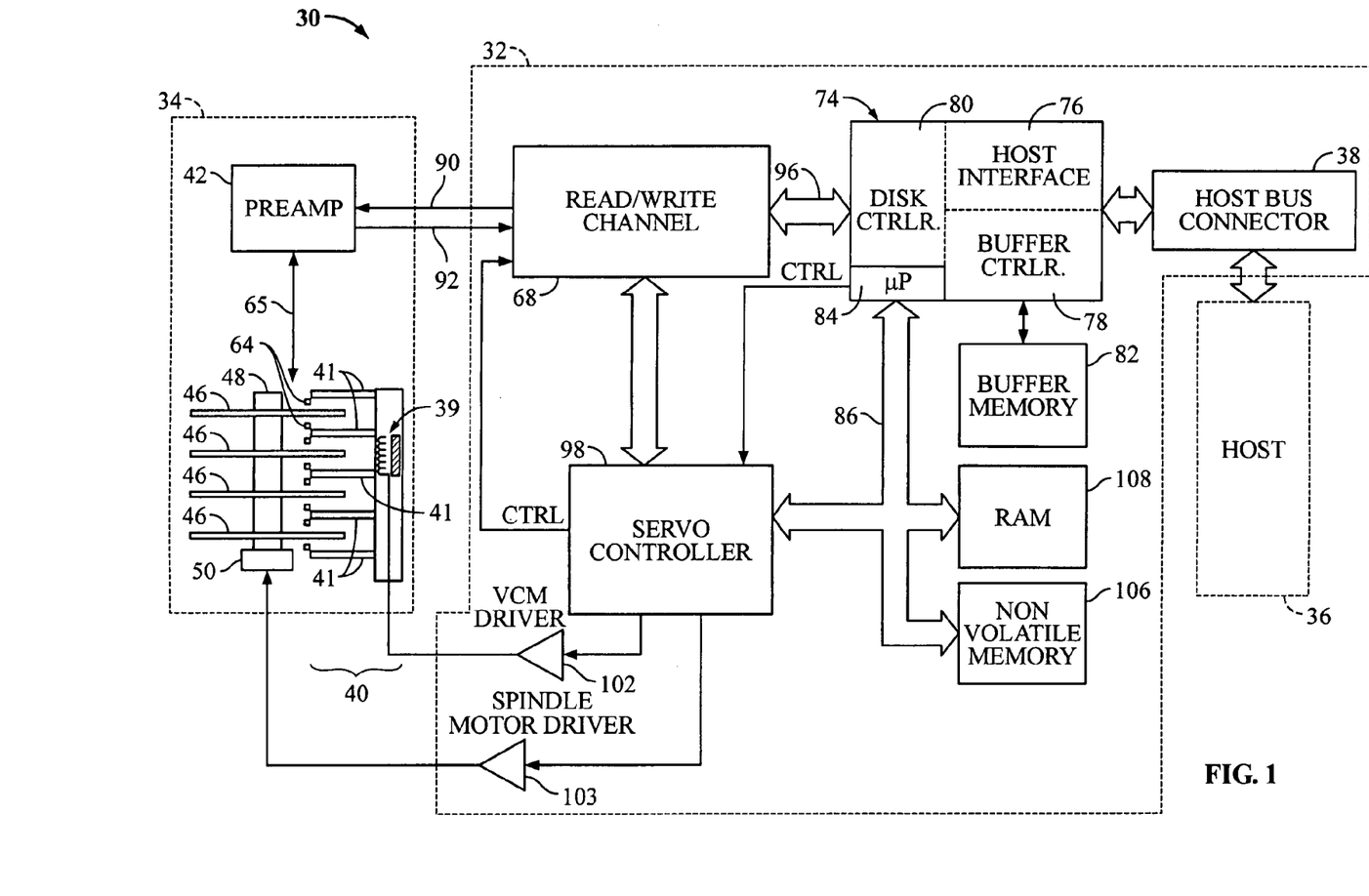
FIG. 1 shows a simplified block diagram of a disk drive, in which embodiments of the invention may be practiced.

FIG. 1 shows a simplified block diagram of an example of a disk drive 30, in which embodiments of the invention may be practiced. Disk drive 30 may comprise a Head/Disk Assembly (HDA) 34 and a controller printed circuit board assembly (PCBA) 32. Host 36 may be a computing device 36 such as a desktop computer, a laptop computer, a mobile computing device (e.g. PDA, camera, cell-phone, etc.), or any type of computing device. Disk drive 30 may be of a suitable form factor and capacity for larger computers or for smaller mobile devices (e.g. a small form factor (SFF) disk drive).

The HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively. The actuator assembly 40 may utilize a voice coil motor (VCM) 39 to rotate the actuator arms. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface and disk controller (HIDC) 74, voice coil motor driver (VCM) 102, spindle motor driver (SMD) 103, microprocessor 84, and several memory arrays—buffer or cache memory 82, RAM 108, and non-volatile memory 106.

For the purposes of the present specification, it should be appreciated that the terms "microprocessor", "processor", and "controller" refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc.

Further, it should be appreciated that the term "memory" may include any type of memory device adapted to store digital information, such as volatile memory and non-volatile memory. Examples of volatile memory, e.g. random access memory (RAM), include static random access memory (SRAM), dynamic random access memory (DRAM), synchronous dynamic random access memory (SDRAM), and double data rate (DDR) SDRAM or DRAM, etc. Examples of non-volatile memory may include read-only memory (ROM), flash memory, etc.

Host initiated operations for reading and writing data in disk drive 30 are executed under control of microprocessor 84 connected to the controllers and memory arrays via a bus 86. Program code executed by microprocessor 84 is stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques, although the invention may be practiced with equal advantage using other coding processes.

HIDC 74 comprises a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk drive operations.

The servo controller 98 provides an interface between microprocessor 84 and actuator assembly 40 and spindle motor 50. Microprocessor 84 commands logic in servo controller 98 to position actuator assembly 40 using a VCM driver 102 to drive VCM 39 and to precisely control the rotation of spindle motor 50 with a spindle motor driver 103.

In one embodiment, disk drive 30 employs a sampled servo system in which equally spaced servo wedge sectors (termed "servo wedges") are recorded on each track of each disk 46. Data sectors are recorded in the intervals between servo sectors on each track. Servo sectors are sampled at regular intervals by servo controller 98 to provide servo position information to microprocessor 84. Servo sectors are received by channel 68, and are processed by servo controller 98 to provide position information to microprocessor 84 via bus 86.

As will be discussed, servo controller 98 may operate under the control of a program or routine, to execute methods or processes in accordance with embodiments of the invention related to estimating repeatable runout (RRO) based upon an optimal mean square estimation (MSE) learning method. Alternatively, as will be discussed, a test computer under the control of a program or routine may likewise execute methods or processes in accordance with embodiments of the invention related to estimating RRO based upon an optimal MSE learning method.

Figure 2:
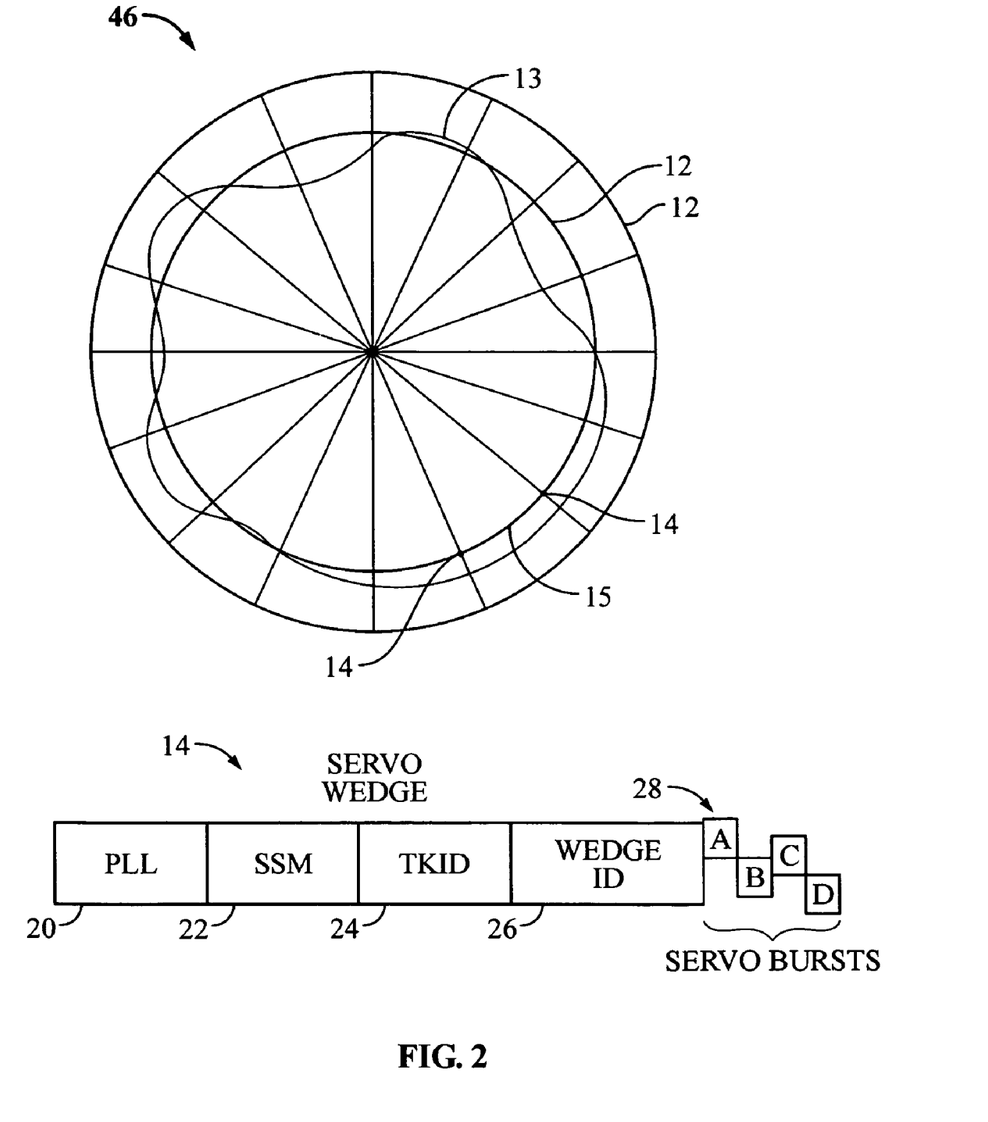
FIG. 2 is a diagram showing a section of a disk of the disk drive of FIG. 1, having a plurality of concentric tracks, and more particularly, illustrates an idealized track and an actual track including WRRO.

With reference to FIG. 2, FIG. 2 is a diagram showing a section of a disk 46 of the disk drive 30 of FIG. 1, having a plurality of concentric tracks, and more particularly, illustrates an idealized track 12 an actual track 13 including WRRO. Disk 46 includes a plurality of concentric circumferential tracks (although only two are particularly shown).

Each circumferential track includes a plurality of embedded servo wedges 14 utilized in seeking and track following. The plurality of servo wedges 14 are spaced sequentially around a circumference of a circumferential track and extend radially outward from the inner diameter of the disk. These embedded servo wedges 14 contain servo information utilized in seeking and track following and are interspersed between data regions 15 of the disk 46. Data is conventionally written in the data regions 15 in a plurality of discrete data sectors. Each data region 15 is typically preceded by a servo wedge 14.

Each servo wedge 14 may include a phase lock loop (PLL) field 20, a servo synch mark (SSM) field 22, a track identification (TKID) field 24, a wedge identifier (ID) 26, and a group of servo bursts (e.g. ABCD) 28 (e.g. an alternating pattern of magnetic transitions), that the servo control system samples to align the moveable transducer head with, and relative to, a particular track.

Typically, the servo controller 98 moves the transducer head 64 toward a desired track during a course (seek mode) using the TKID field 24 as a control input.

Once the transducer head 64 is generally over desired track 12, the servo controller 98 uses the servo bursts (e.g. ABCD) 28 to keep the transducer head 64 over the track in a fine "track follow" mode. During the track following mode, the moveable transducer head 64 repeatedly reads the wedge ID 26 of each successive servo wedge to obtain the binary encoded wedge ID number that identifies each wedge of the track.

Based on the TKID and wedge ID, the servo controller 98 continuously knows where the head 64 is relative to the disk, and communicates this to microprocessor 84. In this way, the microprocessor 84 continuously knows where the head 64 is relative to the disk 46 and can command the movement of the head 64, via the servo control system, to implement disk drive operations such as seeking, tracking, read/write operations, etc.

Further, FIG. 2 illustrates an actual track 13 as opposed to the idealized circular track 12, previously discussed. It should be noted that any variation in the position of a head away from idealized circular track 12 is considered a position error. The portions of track 13 that do not follow circular track 12 create written-in repeatable runout (WRRO) position errors. Thus, track 13 creates WRRO errors because each time a head follows the servo fields 14 that define track 13, it produces the same position errors relative to ideal track 12. Moreover, as noted above, in addition to the WRRO, other repeatable disturbances also occur due to, for example, an unbalanced spindle. The WRRO and other repeatable disturbances are collectively referred to as repeatable runout (RRO).

Embodiments of the present invention relate to a method or process of estimating repeatable runout (RRO) for a disk drive. As will be described in more detail below, the method includes determining a plurality of position error signals (PES) values for a plurality of servo wedges of a track of a disk and estimating the RRO in the PES values for the servo wedges of the track by averaging determined PES values over a pre-determined number of revolutions of the disk of the disk drive. Further, the averaged PES values are scaled by a pre-determined ratio of the variance of non-repeatable runout (NRRO) to the variance of an optimal estimation of the RRO for the disk drive.

In one embodiment, the servo controller 98 may operate under the control of a program or routine to implement this methodology. Alternatively, a test computer operating under the control of a program or routine may be utilized to execute the methods or processes in accordance with the embodiments of the invention.

It should be appreciated that embodiments of the invention related to estimating RRO based upon an optimal mean square estimation (MSE) learning method may be implemented with a test computer, a servo controller, a microprocessor, and/or other circuitry, and combinations thereof. Particularly, servo controller 98, microprocessor 84, a test computer, and/or other circuitry, may operate under the control of a program or routine to execute methods or processes in accordance with embodiments of the present invention related to estimating RRO based upon an optimal MSE learning method. For example, such a program or routine may be implemented in firmware or software.

Figure 3:
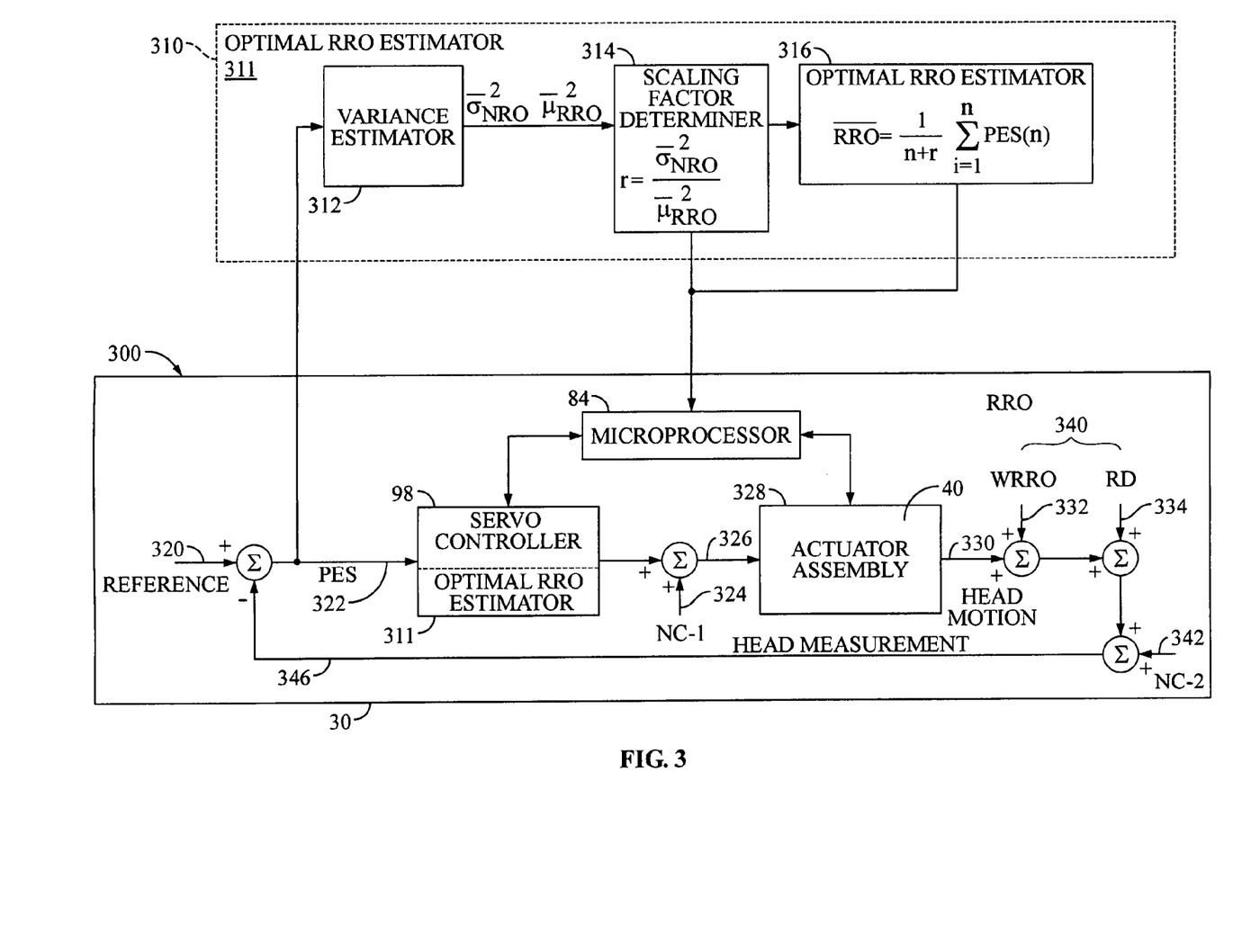
FIG. 3 is a simplified block diagram of an optimal RRO estimator that may used to estimate repeatable runout (RRO) based upon an optimal mean square estimation (MSE) learning method, according to one embodiment of the present invention.

Turning now to FIG. 3, FIG. 3 is a simplified block diagram of an optimal RRO estimator 311 to estimate repeatable runout (RRO) based upon an optimal mean square estimation (MSE) learning method, according to one embodiment of the present invention. In this configuration, the servo loop 300 of a disk drive 30 may be connected to a test computer 310 operating under the control of a program to implement an optimal RRO estimator 311, as will be described. The test computer 310 may be utilized as part of the disk drive manufacturing process. Alternatively, servo controller 98 of the disk drive itself may implement the optimal RRO estimator 311. It should be appreciated that, when the optimal RRO estimator is implemented in a test computer, the test computer includes a suitable processor, memory, display device, etc., to implement a program or routine to effectuate the optimal RRO estimator functionality.

Servo loop 300 includes servo controller 98 and actuator assembly components 40, as previously discussed with reference to FIG. 1.

As previously discussed, servo controller 98 generates a control current 326 that drives the VCM of actuator assembly 40. In response, actuator assembly 40 produces head motion 330. RRO 340 is shown separately even though the RRO would otherwise appear implicitly in head motion 330. RRO 340 includes WRRO 332 and repeatable disturbances (RD) at 334, which are located at harmonic frequencies due to disk motion or motor vibrations. In addition, noise in the servo system has been separated and shown as a first noise component (NC-1) 324, which represents non-repeatable torque disturbances, such as windage, and a second noise component (NC-2) at 342 which may represent analog-to-digital converter noise, electronic noise, etc.

The combination of these signals results in the head's servo measurement signal represented by reference numeral 346. The servo measurement signal 346 is subtracted from a reference signal 320, which is generated by the internal circuitry of the PCBA based on a desired head location. Subtracting servo measurement signal 346 from reference signal 318 produces position error signal (PES) 322, which is input to servo controller 98.

In one embodiment, during manufacture, after servo writing has been carried out, the disk drive is operated in a test environment and is coupled to a test computer 310 that is under the control of a program or routine that implements an optimal RRO estimator 311. The test computer 310 may be suitably coupled to the disk drive to receive the PES signals 322. The test computer 310 utilizing optimal RRO estimator 311 may determine a scaling factor for the disk drive as well as an optimal RRO estimation for the tracks of the disk drive. The scaling factor and the optimal RRO values may then be supplied to the disk drive 30 through the microprocessor 84 of the disk drive. Alternatively, both the scaling factor and the optimal RRO estimation may be calculated by the servo controller 88 of the disk drive itself. It should be appreciated that the RRO values may be provided in micro-inches relative to or from a track center line, as a percentage of track pitch, etc.

Thus, as previously described, either the servo controller 98, itself, or a test computer 310, may implement an optimal RRO estimator 311 to estimate RRO based upon an optimal mean square estimation (MSE) learning method. More particularly, the optimal RRO estimator 311 may determine a plurality of PES values for a plurality of servo wedges of a track of a disk and estimate RRO in the PES values for the servo wedges of the track by averaging determined PES values over a pre-determined number of revolutions of the disk of the disk drive and may then scale the average PES values by a predetermined scaling factor ratio ("r") corresponding to ratio of the variance of the non-repeatable runout (NRRO) to the variance of an optimal estimation of the RRO for the disk drive.

As can be seen in FIG. 3, the optimal RRO estimator 311 includes a variance estimator 312, a scaling factor determiner 314, and an optimal RRO estimator 316. Based upon the PES values 322, variance estimator 312 determines the variance of the NRRO $\hat{\sigma}^2_{NRO}$ and the variance of the optimal estimation of the RRO for the disk drive $\hat{\mu}^2_{RRO}$.

Both $\hat{\sigma}^2_{NRO}$ and $\hat{\mu}^2_{RRO}$ are then utilized by scaling factor determiner 314 to determine a scaling factor ratio $$\left( r = \frac{\hat{\sigma}^2_{NRO}}{\hat{\mu}^2_{RRO}} \right).$$

This scaling factor ratio "r" may then be utilized by optimal RRO estimator 316 to determine an optimal RRO estimation for the tracks of a disk drive. The optimal RRO estimation equation is set forth as:

$$R\hat{R}O = \frac{1}{n+r}\sum_{i=1}^{n} PES(n).$$

It should be noted that the scaling factor ratio "r" which is the ratio of the variance of the NRRO to the variance of an optimal estimation of the RRO may be calculated off-line during disk drive testing for a first disk drive during a calibration process and the scaling factor ratio "r" may thereafter be utilized for subsequent disk drives having similar statistical characteristics. In this way, the scaling factor ratio "r" only has to be determined once and can then be used for a multitude of subsequent disk drives. It should be apparent to those of skill in this art that the determination of the variance of the NRRO and the variance of the RRO can be determined by well-known techniques.

The determined scaling factor ratio "r" factor from scaling factor determiner 314 and the estimated optimal RRO 316 from test computer 310 implementing optimal RRO estimator 311 may then be transmitted back to the disk drive through the microprocessor 84 of the disk drive.

In the test computer manufacturing embodiment, after the scaling factor ratio "r" has been determined for a first disk drive, it does not need to be re-calculated for subsequent disk drives. Test computer 310 can simply optimally estimate the RRO values for subsequent disk drives with optimal RRO estimator 316 utilizing the pre-determined scaling factor ratio "r" factor and transmit these optimally estimated RRO values back to the disk drive 30. In this way, the RRO for a large number of disk drives can be optimally estimated in a very quick and efficient manner based upon the previously-determined scaling factor ratio "r".

As previously discussed, the variance of the NRRO and the variance of the RRO for the disk drive may be calculated by well-known techniques. In fact, in one embodiment, since the scaling factor ratio "r" only has to be determined once for a first disk drive, it may be calculated by the test computer 310 implementing the optimal RRO estimator for a relatively long period of time utilizing a very large number of disk rotations and data points to obtain a very highly accurate scaling factor ratio "r" result that can be used for multiple subsequent disk drives.

Alternatively, the optimal RRO estimator 311 may be implemented by the disk drive 30 itself, during a self-servo calibration process. In this case, servo controller 98 would implement RRO estimator 311 (as previously described) to determine scaling factor ratio "r" and optimally estimated RRO values for the tracks of the disk drive itself. Whether the scaling factor ratio "r" and the RRO values are determined by the test computer 310 or by the disk drive itself, in one embodiment, the ratio may be written to a reserved track of the disk and the RRO values may be written into the servo wedges of the disk.

In one embodiment, optimal RRO estimator 316 may utilize the equation:

$$R\hat{R}O = \frac{1}{n+r}\sum_{i=1}^{n} PES(n).$$

As previously discussed, the scaling factor ratio "r" may be determined during manufacturing based on the history of one or more disk drives or the scaling factor ratio "r" may be determined by the disk drive itself. It should be noted that when "r" equals 0, this algorithm is similar to the conventional RRO averaging algorithm:

$$R\hat{R}O = \frac{1}{n}\sum_{i=1}^{n} PES(n);$$

in which RRO values for wedges of each track are determined by averaging the measured PES over several revolutions. In this case, n is the number of revolutions of the disk of the disk drive and PES (n) is the collected PES on all wedges of that track at an n-th revolution.

Looking more particularly at the optimal RRO estimator equation:

$$R\hat{R}O = \frac{1}{n+r}\sum_{i=1}^{n} PES(n);$$

in this equation, n is the number of revolutions of the disk of the disk drive, PES(n) is a summed PES value for the plurality of servo wedges of the track at an n-th revolution and r is the predetermined scaling factor ratio of the variance of the NRRO to the variance of the optimal estimation of the RRO for the disk drive.

As previously discussed, r is governed by the equation:

$$r = \frac{\hat{\sigma}_{NRO}^2}{\hat{\mu}_{RRO}^2}.$$

In this case $\hat{\sigma}^2_{NRO}$ is the variance of the NRRO of the disk drive and $\hat{\mu}_{RRO}$ is the variance of the optimal estimation of the RRO for the disk drive based upon an RRO estimator.

The RRO estimator may be defined as:

$$\hat{\theta} = \frac{1}{n+r}\sum_{i=1}^{n} X_i.$$

In this equation $X_i$ equals a determined PES value at an n-th sample and $E[X_i]=\hat{\mu}_{RRO}$ and $Var[X_i]=\hat{\sigma}^2_{NRO}$.

It should be appreciated that on any wedge, the measured PES from multiple revolutions are $X_1, X_2, \ldots X_N$, respectively. Assuming that these samples are identically and independently distributed, then $E[X_i]=\hat{\mu}_{RRO}$ and $Var[X_i]=\hat{\sigma}^2_{NRO}$ holds true. In this case, it can be seen that the RRO value on that wedge should be equal to $E[X_i]=\hat{\mu}_{RRO}$.

The scaling factor ratio:

$$r = \frac{\hat{\sigma}_{NRO}^2}{\hat{\mu}_{RRO}^2}$$

yields an optimal estimation of RRO for a disk drive.

Thus, an optimal estimation of the RRO can be determined by utilizing an RRO estimator in which a minimum mean square estimator (MSE) is determined by the equation $MSE(\hat{\theta})=E[(\hat{\theta}-\mu)^2]$ for which the optimal solution is $$r = \frac{\hat{\sigma}_{NRO}^2}{\hat{\mu}_{RRO}^2}.$$

More particularly, if the MSE equation is further disassembled:

$$MSE(\hat{\theta})=E[(\hat{\theta}-\mu)^2]=E[(\hat{\theta}-E(\hat{\theta})+E(\hat{\theta})-\mu)^2]$$

$$=E[((\hat{\theta}-E(\hat{\theta}))^2]+(E(\hat{\theta})-\mu)^2+2E[(\hat{\theta}-E(\hat{\theta})](E(\hat{\theta})-\mu)$$

such that:

$$E[\hat{\theta}-E(\hat{\theta})]=0,$$

and thus, $$MSE(\hat{\theta})=E[(\hat{\theta}-E(\hat{\theta}))^2]+(E(\hat{\theta})-\mu)^2$$

$$=Var[\hat{\theta}]+(Bias[\hat{\theta}])^2$$

Based upon this:

$$MSE(\hat{\theta}) = Var[\hat{\theta}] + \left(Bias[\hat{\theta}]\right)^2$$

$$= \left(\frac{1}{n+r}\right)^2 n\sigma^2 + \left(\frac{r}{n+r}\right)^2 \mu^2$$

And the solution to this equation is:

$$r = \frac{\hat{\sigma}_{NRO}^2}{\hat{\mu}_{RRO}^2}.$$

It can be proven that $$r = \frac{\hat{\sigma}_{NRO}^2}{\hat{\mu}_{RRO}^2}$$

is the solution to the optimal estimator by the following proof.

The RRO estimator may be written as:

$$\hat{\theta} = \frac{1}{n+r}\sum_{i=1}^{n} X_i$$

The variance of the RRO estimator may be written as:

$$\text{Var}[\hat{\theta}] = \left(\frac{1}{n+r}\right)^2 n\sigma^2$$

The expectation of the estimator may be written as:

$$E[\hat{\theta}] = \left(\frac{1}{n+r}\right)\sum_{i=1}^{n} E(X_i) = \frac{n\mu}{n+r}$$

The bias of the estimator may be calculated as:

$$\left(\text{Bias}[\hat{\theta}]\right)^2 = \left(E(\hat{\theta}) - \mu\right)^2 = \left(\frac{n\mu}{n+r} - \mu\right)^2 = \left(\frac{r}{n+r}\right)^2 \mu^2$$

Therefore, $$MSE(\hat{\theta}) = \text{Var}[\hat{\theta}] + \left(\text{Bias}[\hat{\theta}]\right)^2$$
$$= \left(\frac{1}{n+r}\right)^2 n\sigma^2 + \left(\frac{r}{n+r}\right)^2 \mu^2$$

Letting, $$\frac{\partial MSE(\hat{\theta})}{\partial r} = 0$$

The solution is:

$$r = \frac{\sigma^2}{\mu^2}$$

Thus, based on the above, it is seen that $$r = \frac{\hat{\sigma}^2_{NRO}}{\hat{\mu}^2_{RRO}}$$

is the solution to the RRO estimator defined as $$\hat{\theta} = \frac{1}{n+r}\sum_{i=1}^{n} X_i$$

such that the equation $$\frac{1}{n+r}\sum_{i=1}^{n} PES(n)$$

provides an optimal mean square estimation learning method to optimally learn the RRO of a disk drive.

For example, assuming that the RRO on a particular wedge is 1, and the variance of the NRO is also 1, by applying equation:

$$MSE(\hat{\theta}) = \text{Var}[\hat{\theta}] + \left(\text{Bias}[\hat{\theta}]\right)^2$$
$$= \left(\frac{1}{n+r}\right)^2 n\sigma^2 + \left(\frac{r}{n+r}\right)^2 \mu^2;$$

the mean square error MSE (n, r) can be computed at different r values at the n-th revolution.

Figure 4:
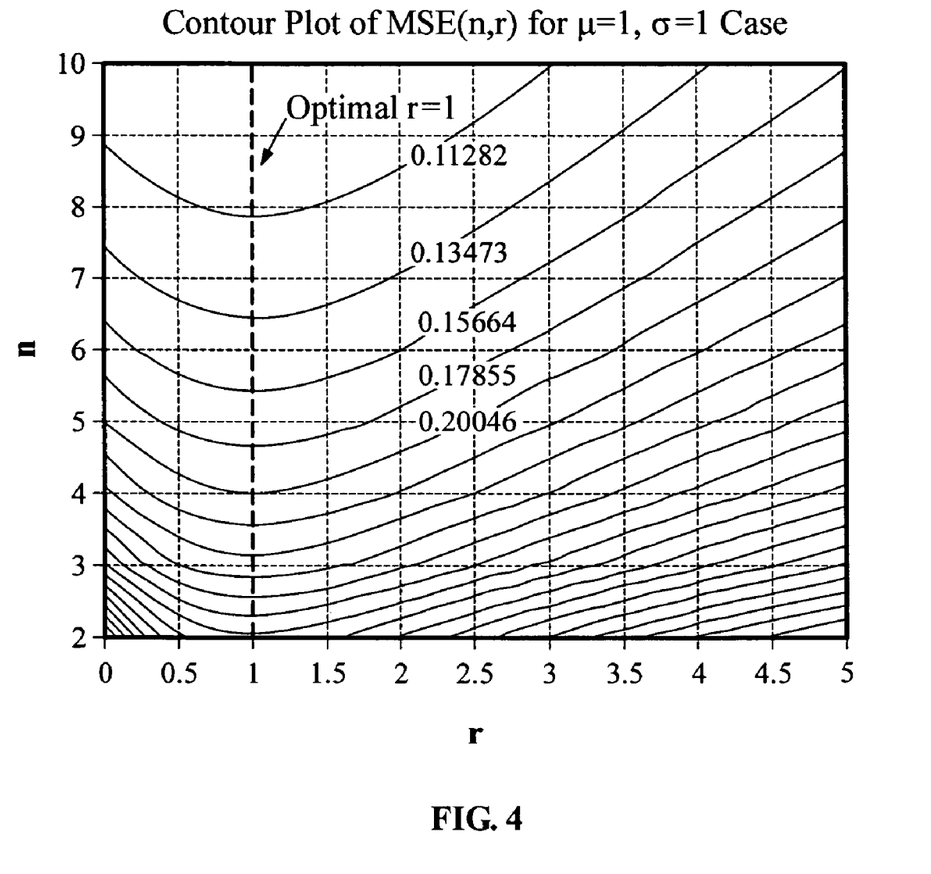
FIG. 4 is a graph showing a contour plot of MSE calculated results, according to one embodiment of the present invention.

Looking at FIG. 4, for example, contour plots of the MSE (n, r) for an RRO of 1 and a NRO of 1, is shown. FIG. 4 is a graph showing the contour plot of MSE calculated results where each curve indicates the same MSE value. Particularly, the X-axis represents r values and the Y-axis represents n values for the number of revolutions.

As can be seen in FIG. 4, for any revolution n, the optimal r is always 1. Results for r=0 are the same results for those as used in the conventional averaging equation:

$$R\hat{R}O = \frac{1}{n}\sum_{i=1}^{n} PES(n).$$

From FIG. 4, it can be seen that MSE (8, 0) is approximately equal to MSE (7, 1), which means that one learning revolution can be reduced without sacrificing accuracy. Thus, there is little sensitivity to the value of r. Particularly, over a wide rage around the optimal 1 (0<r<2.5), the algorithm $$R\hat{R}O = \frac{1}{n+r}\sum_{i=1}^{n} PES(n)$$

achieves better results than the conventional averaging algorithm $$R\hat{R}O = \frac{1}{n}\sum_{i=1}^{n} PES(n).$$

It can be easily seen from:

$$MSE(\hat{\theta}) = \text{Var}[\hat{\theta}] + \left(\text{Bias}[\hat{\theta}]\right)^2$$
$$= \left(\frac{1}{n+r}\right)^2 n\sigma^2 + \left(\frac{r}{n+r}\right)^2 \mu^2$$

that:

$$\text{If } \begin{cases} 0 < r < \frac{2n\sigma^2}{n\mu^2 - \sigma^2}, & \text{for } n\mu^2 > \sigma^2 \\ r > 0, & \text{for } n\mu^2 < \sigma^2 \end{cases}$$

then, $MSE(n, r) < MSE(n, 0)$.

As previously discussed, for disk drives in the same manufacturing cycle that have similar statistical information, scaling factor ratio r can be estimated by fully calibrating one disk drive. Thereafter, this learned r value can then be applied to other disk drives. Also, one r value can be utilized for the whole disk drive, or alternatively, for different zones of the disk drive. Alternatively, as previously discussed, an r value may be determined during a self servo-calibration process where an individual disk drive, by itself, determines its own r value. The disk drive may estimate the r value for each wedge based upon learned PES during a pre-determined number of learning revolutions. This may be of specific benefits for some wedges with large NRO noises.

Whether the scaling factor ratio r is determined as part of a manufacturing cycle for an ideal disk drive and then utilized for a number of different subsequent disk drives having similar statistical information or whether the r value is determined by a single disk drive during a self-servo calibration process, the ratio r may be written to the disk drive within a reserved track of the disk. Further, the determined RRO values determined by the optimal mean square learning method, whether done as part of the manufacturing process or during a self-servo calibration process, may be written in each servo wedge of the disk.

Figure 5:
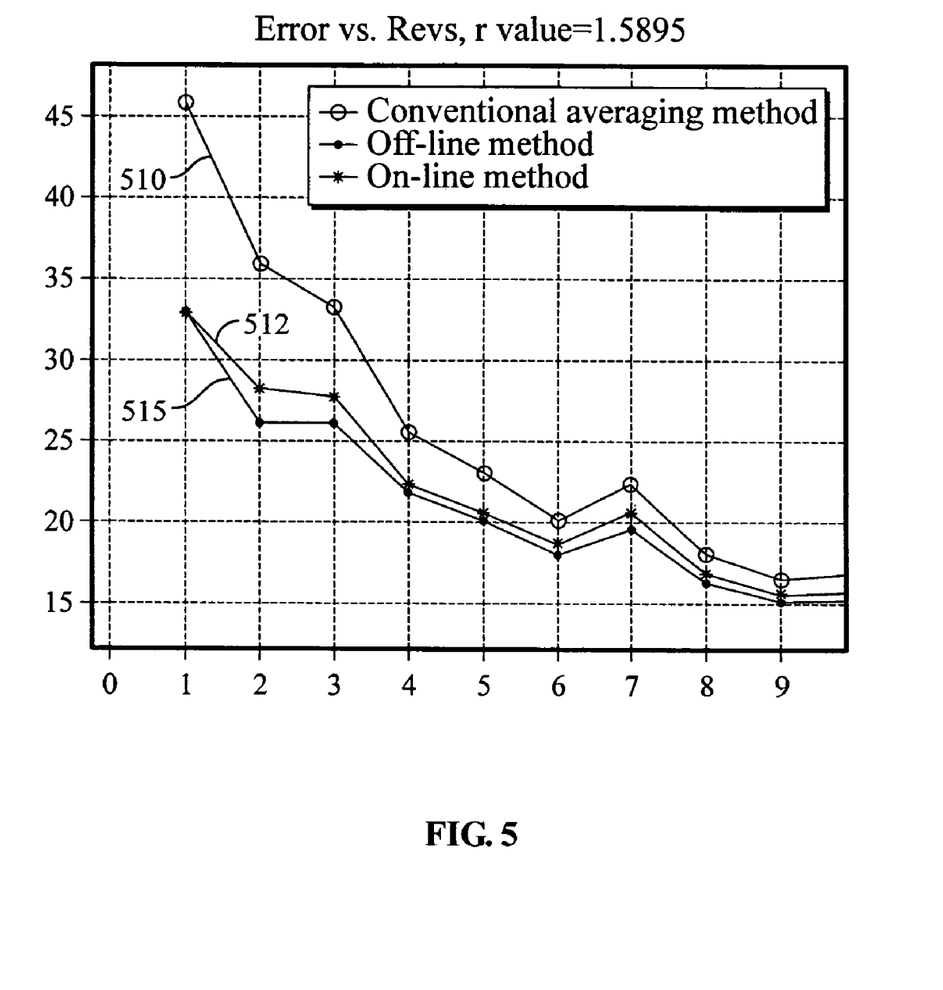
FIG. 5 is a graph showing examples of normalized errors versus number of revolutions for the conventional averaging method and the optimal mean square estimation (MSE) learning method for both off-line determination during manufacturing and on-line self servo-calibration, according to one embodiment of the present invention.

Turning now to FIG. 5, FIG. 5 is a graph showing examples of normalized errors versus number of revolutions for the conventional averaging method and the optimal mean square estimation (MSE) learning method for both off-line determination during manufacturing and on-line self servo-calibration. The Y-axis represents normalized errors and the X-axis represents the number of revolutions.

Particularly, line 510 shows normalized errors versus number of revolutions for the conventional averaging method, line 512 shows normalized errors versus number of revolutions for the optimal MSE learning method for on-line self servo-calibration, and line 515 shows normalized errors versus number of revolutions for the optimal MSE learning method as applied during the manufacturing cycle. It can be seen that the optimal MSE learning method as part of the manufacturing embodiment is slightly better than the self-servo calibration embodiment, and that both yield far less errors than the conventional averaging method. Further, both converge much faster than the conventional method.

Thus, in comparison to the conventional method, the optimal MSE learning method is more accurate and less time intensive. Additionally, the optimal MSE learning method can also be utilized in a self-servo calibration process. Moreover, there is no Gaussian assumption on the NRO as is required in other types of Kalman filter RRO learning methods. It should be noted that a Gaussian assumption may not be true in disk drives.

As previously discussed, embodiments of the invention, which related to estimating RRO based upon an optimal mean square estimation (MSE) learning method may be implemented with a test computer, a servo controller, a microprocessor, and/or other circuitry, and combinations thereof. Particularly, a servo controller, a microprocessor, a test computer, and/or other circuitry, may operate under the control of a program or routine to execute methods or processes in accordance with embodiments of the present invention related to estimating RRO based upon an optimal MSE learning method. For example, such a program may be implemented in firmware or software.

Components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements.

The program or code segments may be stored in a processor readable medium or transmitted by a data signal embodied in a carrier wave, or a signal modulated by a carrier, over a transmission medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

It should be appreciated that the method and processes previously discussed can be employed for disk drives with an embedded servo system. Further, numerous alternative methods for disk drives with similar or other media format characteristics can be employed by those skilled in the art to use the invention with equal advantage to implement the estimated RRO estimation techniques based upon an optimal MSE learning method. Further, although embodiments have been described in the context of a disk drive with embedded servo sectors, the invention can be employed in many different types of rotating media storage devices having any type of head actuator scanning media having differing types of servo schemes.

We claim:

1. A method of estimating repeatable runout (RRO) for a disk drive comprising:

determining a plurality of position error signal (PES) values for a plurality of servo wedges of a track of a disk; and estimating repeatable runout (RRO) in the PES values for the servo wedges of the track by averaging determined PES values over a pre-determined number of revolutions of the disk of the disk drive and scaling the averaged PES values by a pre-determined ratio of the variance of non-repeatable runout (NRRO) to the variance of an optimal estimation of the RRO for the disk drive, wherein the RRO value is governed by an equation:

$$R\hat{R}O = \frac{1}{n+r}\sum_{i=1}^{n} PES(n);$$

wherein n is a number of revolutions of the disk of the disk drive, PES(n) is a summed PES value for the plurality of servo wedges of the track at an n-th revolution, and r is the pre-determined ratio of the variance of NRRO to the variance of the optimal estimation of the RRO for the disk drive.

2. The method of claim 1, wherein r is governed by an equation:

$$r = \frac{\bar{\sigma}^2_{NRO}}{\hat{\mu}^2_{RRO}};$$

wherein $\bar{\sigma}^2_{NRO}$=the variance of NRRO of the disk drive and $\hat{\mu}^2_{RRO}$=the variance of the optimal estimation of the RRO for the disk drive based upon an RRO estimator defined as $$\hat{\theta} = \frac{1}{n+r}\sum_{i=1}^{n} X_i$$

in which $X_i$ equals a determined PES value at an n-th sample and $E[X_i]=\hat{\mu}_{RRO}$ and $Var[X_i]=\hat{\sigma}^2_{NRO}$.

3. The method of claim 2, further comprising determining an optimal estimation of the RRO estimator by determining a minimum mean square error (MSE) for the RRO estimator defined by the equation, $MSE(\hat{\theta})=E[(\hat{\theta}-\mu)^2]$ wherein:

$$MSE(\hat{\theta}) = Var[\hat{\theta}] + (Bias[\hat{\theta}])^2$$
$$= \left(\frac{1}{n+r}\right)^2 n\sigma^2 + \left(\frac{r}{n+r}\right)^2 \mu^2;$$

and wherein a solution to a derivative of $MSE(\hat{\theta})$, $$\frac{\partial MSE(\hat{\theta})}{\partial r} = 0,$$

yields an optimal solution:

$$r = \frac{\hat{\sigma}^2_{NRO}}{\hat{\mu}^2_{RRO}}.$$

4. The method of claim 1, wherein the ratio is determined for a first disk drive during a calibration process and the ratio is thereafter utilized for subsequent disk drives.

5. The method of claim 1, wherein the ratio is determined by the disk drive itself during a self servo-calibration process.

6. The method of claim 1, wherein the ratio is written to a reserved track of the disk.

7. The method of claim 1 wherein the RRO value is written in the servo wedge of the disk.

8. A disk drive to estimate repeatable runout (RRO), the disk drive comprising:
   a disk including at least one track having a plurality of servo wedges;
   a moveable head; and
   a servo controller for controlling the position of the moveable head to perform track following on the plurality of servo wedges of the track and to measure a plurality of position error signal (PES) values, the servo controller to:
   determine a plurality of position error signal (PES) values for a plurality of servo wedges of the track of the disk; and
   estimate repeatable runout (RRO) in the PES values for the servo wedges of the track by averaging determined PES values over a pre-determined number of revolutions of the disk of the disk drive and scaling the averaged PES values by a pre-determined ratio of the variance of non-repeatable runout (NRRO) to the variance of an optimal estimation of the RRO for the disk drive, wherein the RRO value is governed by an equation:

$$\hat{RRO} = \frac{1}{n+r}\sum_{i=1}^{n} PES(n);$$

wherein n is a number of revolutions of the disk of the disk drive, PES(n) is a summed PES value for the plurality of servo wedges of the track at an n-th revolution, and r is the pre-determined ratio of the variance of NRRO to the variance of the optimal estimation of the RRO for the disk drive.

9. The disk drive of claim 8, wherein r is governed by an equation:

$$r = \frac{\hat{\sigma}^2_{NRO}}{\hat{\mu}^2_{RRO}};$$

wherein $\hat{\sigma}^2_{NRO}$=the variance of NRRO of the disk drive and $\hat{\mu}^2_{RRO}$=the variance of the optimal estimation of the RRO for the disk drive based upon an RRO estimator defined as $$\hat{\theta} = \frac{1}{n+r}\sum_{i=1}^{n} X_i$$

in which $X_i$ equals a determined PES value at an n-th sample and $E[X_i]=\hat{\mu}_{RRO}$ and $Var[X_i]=\hat{\sigma}^2_{NRO}$.

10. The disk drive of claim 9, wherein an optimal estimation of the RRO estimator is estimated by determining a minimum mean square error (MSE) for the RRO estimator defined by the equation, $MSE(\hat{\theta}) E[(\hat{\theta}-\mu)^2]$ wherein:

$$MSE(\hat{\theta}) = Var[\hat{\theta}] + (Bias[\hat{\theta}])^2$$
$$= \left(\frac{1}{n+r}\right)^2 n\sigma^2 + \left(\frac{r}{n+r}\right)^2 \mu^2;$$

and wherein a solution to a derivative of $MSE(\hat{\theta})$, $$\frac{\partial MSE(\hat{\theta})}{\partial r} = 0,$$

yields an optimal solution:

$$r = \frac{\hat{\sigma}^2_{NRO}}{\hat{\mu}^2_{RRO}}.$$

11. The disk drive of claim 8, wherein the ratio is determined for a first disk drive during a calibration process and the ratio is thereafter utilized for subsequent disk drives.

12. The disk drive of claim 8, wherein the ratio is determined during a self servo-calibration process.

13. The disk drive of claim 8, wherein the ratio is written to a reserved track of the disk.

14. The disk drive of claim 8 wherein the RRO value is written in the servo wedge of the disk.

* * * * *